US009247559B2

(12) United States Patent
Devi et al.

(10) Patent No.: US 9,247,559 B2
(45) Date of Patent: Jan. 26, 2016

(54) DYNAMICALLY DELAYED DELIVERY OF CONTENT IN A NETWORK

(71) Applicant: International Business Machines Corporation, Armonk, NY (US)

(72) Inventors: Umamaheswari Devi, Bangalore (IN); Ravindranath Kokku, Hyderabad (IN); Shivkumar Kalyanaraman, Bangalore (IN); Mukundan Madhavan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 14/169,277

(22) Filed: Jan. 31, 2014

(65) Prior Publication Data

US 2015/0223260 A1    Aug. 6, 2015

(51) Int. Cl.
| | |
|---|---|
| *H04W 72/08* | (2009.01) |
| *H04W 72/04* | (2009.01) |
| *H04W 28/20* | (2009.01) |
| *H04W 24/04* | (2009.01) |
| *H04W 72/12* | (2009.01) |
| *H04M 15/00* | (2006.01) |

(52) U.S. Cl.
CPC .......... *H04W 72/1226* (2013.01); *H04M 15/42* (2013.01); *H04W 28/20* (2013.01); *H04W 72/1205* (2013.01); *H04W 72/1257* (2013.01)

(58) Field of Classification Search
CPC ............ H04W 72/12; H04W 72/1205; H04W 72/1257
See application file for complete search history.

(56) References Cited

U.S. PATENT DOCUMENTS

| | | | |
|---|---|---|---|
| 5,878,351 | A | 3/1999 | Alanara et al. |
| 7,356,571 | B2 | 4/2008 | Haller |
| 7,747,300 | B1 * | 6/2010 | de Barros ...................... 455/703 |
| 2003/0045273 | A1 | 3/2003 | Pyhalammi et al. |
| 2005/0188089 | A1 * | 8/2005 | Lichtenstein et al. ........ 709/226 |

(Continued)

FOREIGN PATENT DOCUMENTS

| | | |
|---|---|---|
| EP | 1889413 B1 | 7/2012 |
| WO | 03003164 A2 | 1/2003 |

OTHER PUBLICATIONS

Wikipedia, Background Intelligent Transfer Service, Nov. 5, 2013, https://en.wikipedia.org/w/index.php?title=Background_Intelligent_Transfer_Service&oldid=580273553.

(Continued)

*Primary Examiner* — Bobbak Safaipour
*Assistant Examiner* — Devan Sandiford
(74) *Attorney, Agent, or Firm* — Ryan, Mason & Lewis, LLP

(57) ABSTRACT

Methods, systems, and articles of manufacture for dynamically delayed delivery of content in a network are provided herein. A method includes receiving, from a user device coupled to a network, a request for a content from the network; estimating a measure of available bandwidth on the network for delivery of the requested content at each of multiple periods of time; generating multiple schedules for the delivery of the requested content, wherein each of the multiple schedules is based on (i) the measure of available bandwidth on the network at one of the multiple periods of time and (ii) a predefined set of scheduling rules associated with the user device and the network; and delivering the requested content to the user device according to a schedule selected from the multiple schedules.

19 Claims, 7 Drawing Sheets

(56) References Cited

U.S. PATENT DOCUMENTS

| | | | |
|---|---|---|---|
| 2008/0153523 A1 | 6/2008 | Febonio et al. | |
| 2009/0006599 A1 | 1/2009 | Brownrigg, Jr. | |
| 2010/0011056 A1 | 1/2010 | Bryson et al. | |
| 2010/0198943 A1 | 8/2010 | Harrang et al. | |
| 2011/0299545 A1* | 12/2011 | Karaoguz et al. | 370/401 |
| 2011/0302324 A1* | 12/2011 | Karaoguz et al. | 709/246 |
| 2013/0024901 A1* | 1/2013 | Sharif-Ahmadi et al. | 725/114 |
| 2013/0081072 A1* | 3/2013 | Alward et al. | 725/14 |
| 2014/0295789 A1 | 10/2014 | Devi et al. | |

OTHER PUBLICATIONS

Lee et al. Economics of WIFI Offloading: Trading Delay for Cellular Capacity, arxiv:1207.6607v2 [cs.N1] Dec. 31, 2012.

Liu et al. A Delay Pricing Scheme for Real-Time Delivery in Deadline-Based Networks, Internet and Network Economics Lecture Notes in Computer Science, vol. 3828, 2005, pp. 225-235.

Paul et al. Opportunistic Traffic Scheduling in Cellular Data Networks, Dynamic Spectrum Access Networks (DYSPAN), 2012, IEEE.

Venkataramani et al., "TCP Nice: A mechanism for background transfers," OSDI 2002.

Kuzmanovic et al., "TCP-LP: low-priority service via end-point congestion control," A., TON Aug. 2006.

Kokku et al., "A Multipath Background Network Architecture," INFOCOM 2007.

Key et al., "Emulating low-priority transport at the application layer: a background transfer service," SIGMETRICS 2004.

Gabale et al., Async: De-congestion and Yield Management in Cellular Data Networks. ICNP 2013, Oct. 8, 2013.

\* cited by examiner

DYNAMICALLY DELAYED DELIVERY OF CONTENT IN A NETWORK

FIELD OF THE INVENTION

Embodiments of the invention generally relate to information technology, and, more particularly, to content delivery over a network.

BACKGROUND

Content delivery over telecommunication networks includes a variety of challenges. For example, such networks can be expensive as well as perishable (that is, unutilized resources are wasted), and adoption of some networks remains relatively low. While reducing overall network service price (for example, cheaper subscription plans) may increase adoption, such an approach will potentially lower the quality of experience (QoE) and may not be cost-effective for service providers.

Accordingly, a need exists for delivery models that can be coupled with application services to exploit less-congested times to increase overall network utilization and meet QoE expectations.

SUMMARY

In one aspect of the present invention, techniques for dynamically delayed delivery of content in a network are provided. An exemplary computer-implemented method can include steps of receiving, from a user device coupled to a network, a request for a content from the network; estimating a measure of available bandwidth on the network for delivery of the requested content at each of multiple periods of time; generating multiple schedules for the delivery of the requested content, wherein each of the multiple schedules is based on (i) the measure of available bandwidth on the network at one of the multiple periods of time and (ii) a pre-defined set of scheduling rules associated with the user device and the network; and delivering the requested content to the user device according to a schedule selected from the multiple schedules.

In another aspect of the invention, an exemplary computer-implemented method can include steps of fetching uniform resource locator information from a content server, wherein said uniform resource locator information corresponds to an item of content requested by a user device; calculating (i) multiple schedules for delivering the item of content to the user device and (ii) a corresponding pricing scheme corresponding to each of the multiple schedules, wherein said calculating is based on a number of already-accepted content delivery flows and each schedule corresponding thereto, a size of the item of content requested by the user device, network channel quality associated with the user device, and a pricing tier associated with the user device; transmitting, to the user device, (i) the multiple schedules for delivering the item of content to the user device and (ii) the corresponding pricing scheme corresponding to each of the multiple schedules; and delivering the requested content to the user device according to one of the multiple schedules selected by the user device.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes smart and/or dynamically delayed delivery of content in a data network, which can include a wired or a wireless network (such as a Wi-Fi network or a cellular network), which may or may not be mobile. At least one embodiment of the invention includes providing system architecture for network-controlled delayed-delivery of data to users such that data are transferred at periods of low-network usage in a manner agreed upon by both the network and the user prior to the delayed delivery of content. As used herein, at least one embodiment of the invention described herein refers to an "Async" system and components thereof, wherein the Async system enables a network operator to manage the growth of data by leveraging the delay-elastic nature of certain applications and the price-sensitive nature of certain users. As further detailed herein, Async provides an asynchronous content-delivery paradigm for user-requested content (for example, videos), and facilitates a network operator to negotiate with users a delay in delivery in exchange for one or more incentives.

Figure 1:
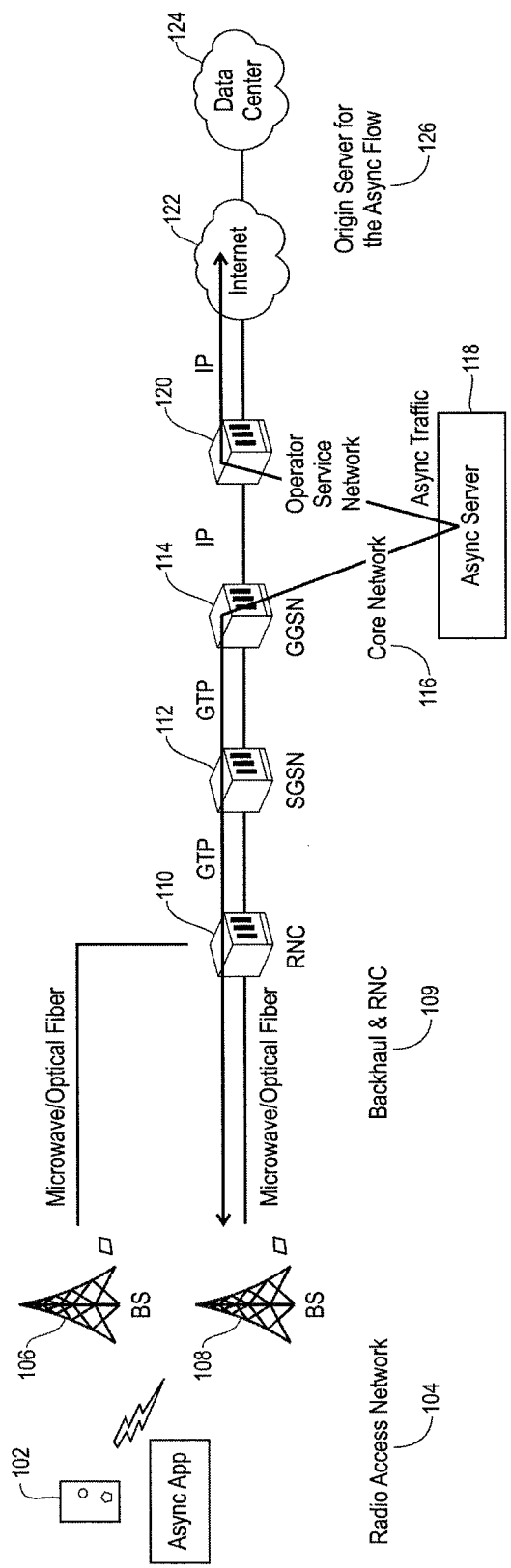
FIG. 1 is a diagram illustrating architecture for delayed delivery in a cellular network, according to an embodiment of the invention.

FIG. 1 is a diagram illustrating architecture for delayed delivery in a cellular network, according to an embodiment of the invention. By way of illustration, FIG. 1 depicts a user device 102 (such as, for example, a mobile phone) communicatively in contact with base stations (BS) 106 and 108 within a radio access network 104. As also indicated in FIG. 1, the user device 102 includes an application (noted as Async app) for use in conjunction with a server 118 (noted as Async server). The base stations 106 and 108 can be connected, as illustrated, to a backhaul and radio network control (RNC) component 109, wherein a link (such as an optical fiber link) connects each base station with an RNC 110.

The RNC 110 is connected to a serving general packet radio service support node (SGSN) 112 of a core network 116 via a general packet radio service tunneling protocol (GTP) link. The core network 116 additionally includes a gateway general packet radio service support node (GGSN) 114 connected via a GTP to the SGSN 112 as well as to an operator service network 120 via an internet protocol (IP) link. Further, the operator service network 120 is connected via an external link to the internet 122, which is in communicative contact with a data center 124.

As also depicted in FIG. 1, a server (herein referred to as Async server) 118 is implemented for delivery scheduling of content to the user device 102. Async server 118, as illustrated in the example architecture of FIG. 1, can be deployed between the operator service network 120 and the GGSN 114. It should be appreciated, however, that this configuration is merely one example, and alternative configurations can be implemented in accordance with one or more embodiments of the invention.

As additionally described herein, data and/or content can be requested by a user, for example, via the Async app in the user device 102). A corresponding data flow can then be redirected to a terminating proxy in Async server 118, and the Async server 118 can respond to the user by providing the user (via the Async app, for example) one or more choices for delivery deadlines and associated prices.

In at least one embodiment of the invention, the Async server 118 can establish multiple hypertext transfer protocol (HTTP) connections to an origin server 126 that is hosting the requested data and/or content, and the relevant content may be transferred between the Async server 118 and the origin server 126 using multiple HTTP requests. Additionally, the Async server 118 can also cache the content for delivery to the client and/or subsequent re-use. Further, at least one embodiment of the invention includes implementation of a poll-back model wherein the use makes multiple requests at times suggested by Async server 118.

By way of illustration, consider the following example sequence of events occurring within the context of at least one embodiment of the invention. The user, via user device 102 (and more specifically, via the Async app), generates a download request in connection with one or more given items of data and/or content. Accordingly, the Async proxy (also noted as Async server 118 in FIG. 1) fetches uniform resource locator (URL) information (file-size) from a content server (such as origin server 126) associated with the data and/or content identified in the download request. The Async proxy additionally fetches user class information (that is, class information pertaining to the user generating the download request) from a local database, and calculates achievable deadlines and corresponding pricing schemes for the requested download based, in part, on the class information. The Async proxy further transmits a list of such deadlines to the user, and awaits user response of a deadline choice. If a deadline is selected, the Async proxy initializes the state and starts the download in accordance with the deadline selection. As used herein, "state" can include the deadline chosen by the end-user and the amount of content transmitted thus far (to that point in time). If no deadline is selected by the user, the Async proxy can repeat the above-noted process with additional deadline choices. As detailed further herein, deadlines can be negotiated between the user and the network proxy, and deadlines can also be determined and/or selected based on network conditions, user subscription class, etc.

Figure 2:
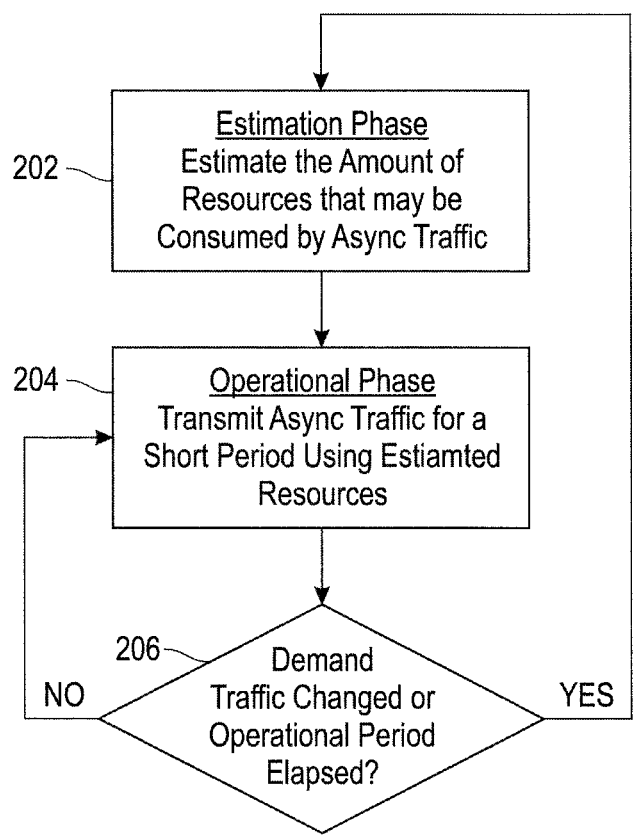
FIG. 2 is a diagram illustrating techniques for estimating the number of allowed flows, according to an aspect of the invention.

FIG. 2 is a diagram illustrating techniques for estimating the number of allowed Async flows, according to an aspect of the invention. By way of illustration, FIG. 2 depicts an estimation phase 202, which includes estimating the amount of resources that can be consumed by Async traffic. In at least one embodiment of the invention, the estimation phase 202 can be implemented periodically, such as, for example, every x minutes. Additionally, FIG. 2 depicts an operational phase 204, which includes transmitting traffic for a specified period of time (for example, for the noted period of x minutes) using the resources estimated in phase 202.

Further, as also illustrated in FIG. 2, step 206 includes determining whether traffic has changed or if the operational period (for example, the noted period of x minutes) has elapsed. If yes (that is, traffic has changed or the operational period has elapsed), then the technique returns to estimation phase 202. Additionally, in at least one embodiment of the invention, if demand traffic or network conditions change during the noted period (for example, x minutes), the Async proxy can activate or deactivate the relevant Async flows. If traffic has not changed or the operational period has not elapsed, then the technique returns to the operational phase 204. As noted above, deactivation and activation denote suspension of transmission to Async flows when available bandwidth is perceived to decrease, and the resumption of such transmission when bandwidth increases, respectively.

Figure 3:
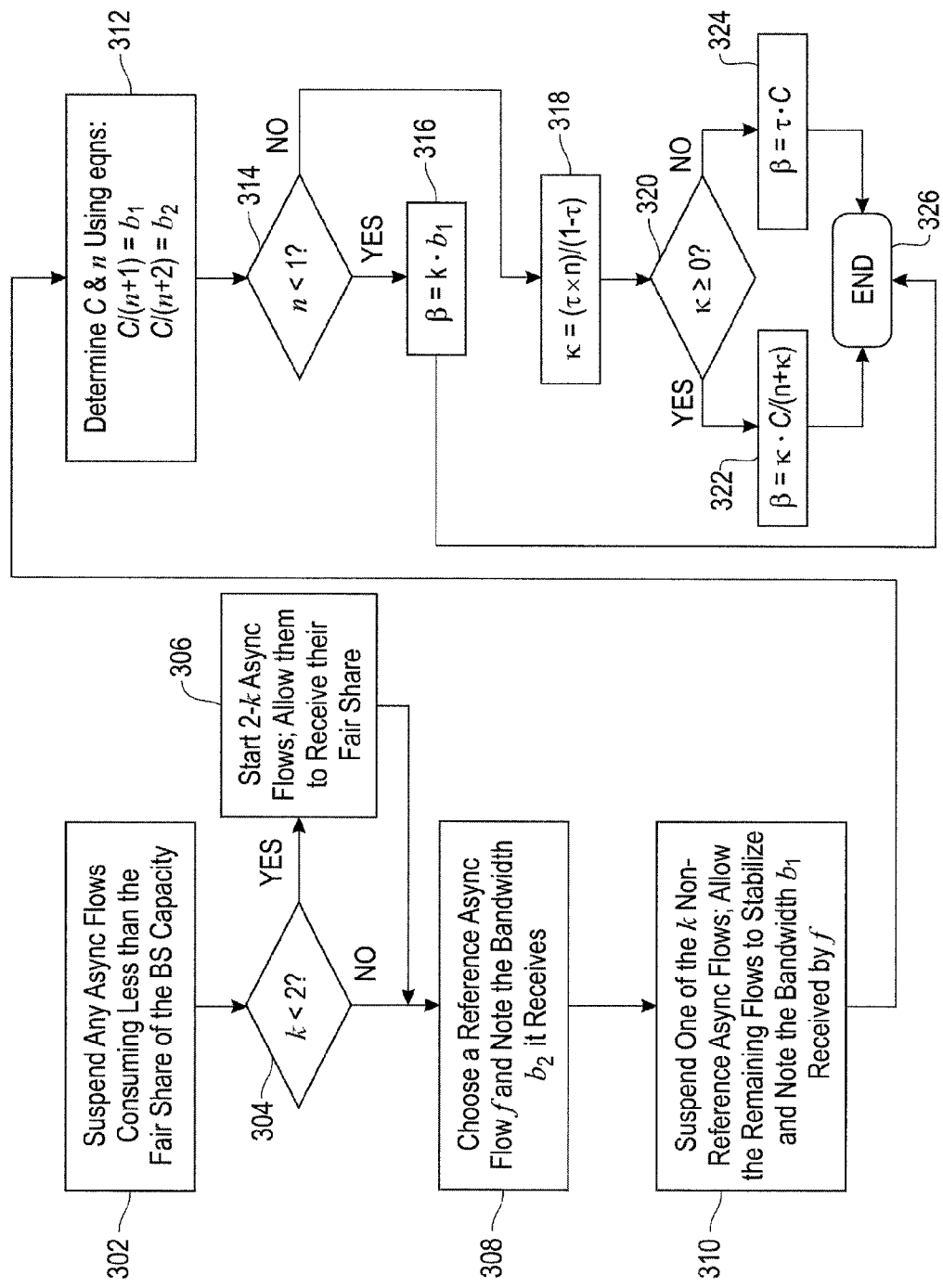
FIG. 3 is a flow diagram illustrating techniques according to an embodiment of the invention.

FIG. 3 is a flow diagram illustrating techniques according to an embodiment of the invention. By way of illustration, FIG. 3 depicts example steps carried out in furtherance of the estimation phase 202, as detailed in FIG. 2, in a cellular network, or more generally, in networks with routers employing fair traffic scheduling algorithms, such as proportional-fair scheduling or weighted-fair scheduling. An estimation phase in networks with traditional scheduling algorithms such as first-come-first-served (FCFS) can be performed, for example, using known techniques in networking literature. Accordingly, step 302 includes suspending any Async flows consuming less than a fair share of base station capacity. If the number of Async flows receiving a fair share (k) is less than 2 (as determined in step 304), then 2–k Async flows are started and allowed to receive the fair share in step 306. Thereafter, or if k is already greater than or equal to 2, a reference Async flow f is chosen and the bandwidth $b_2$ it receives is identified in step 308. Additionally, in step 310, one of the k non-reference Async flows is suspended, and the remaining flows are allowed to stabilize, and the bandwidth $b_1$ received by f is identified.

Further, step 312 includes determining a quantity C, which is the base station capacity, and the number of demand flows n via the following equations:

$$C/(n+1)=b_1; \text{ and}$$

$$C/(n+2)=b_2.$$

If n is less than 1 (as determined in step 314), then β, the bandwidth for Async flows, is estimated as $k*b_1$ in step 316. Otherwise, a quantity κ is defined in step 318 as $(\tau*n)/(1-\tau)$, wherein i is the interference bound. Further, if κ is greater than or equal to zero (as determined in step 320), then β is estimated in step 322 as $(\kappa*C)/(n+\kappa)$. Otherwise, β is estimated as $(\tau*C)$ in step 324, and the process ends in step 326.

Additional description of the techniques detailed in FIG. 3 can be found, by way of example, in U.S. application Ser. No. 13/854,084, filed on Mar. 30, 2013 and entitled "Delayed Delivery with Bounded Interference in a Cellular Data Network," which is incorporated by reference herein in its entirety.

Figure 4:
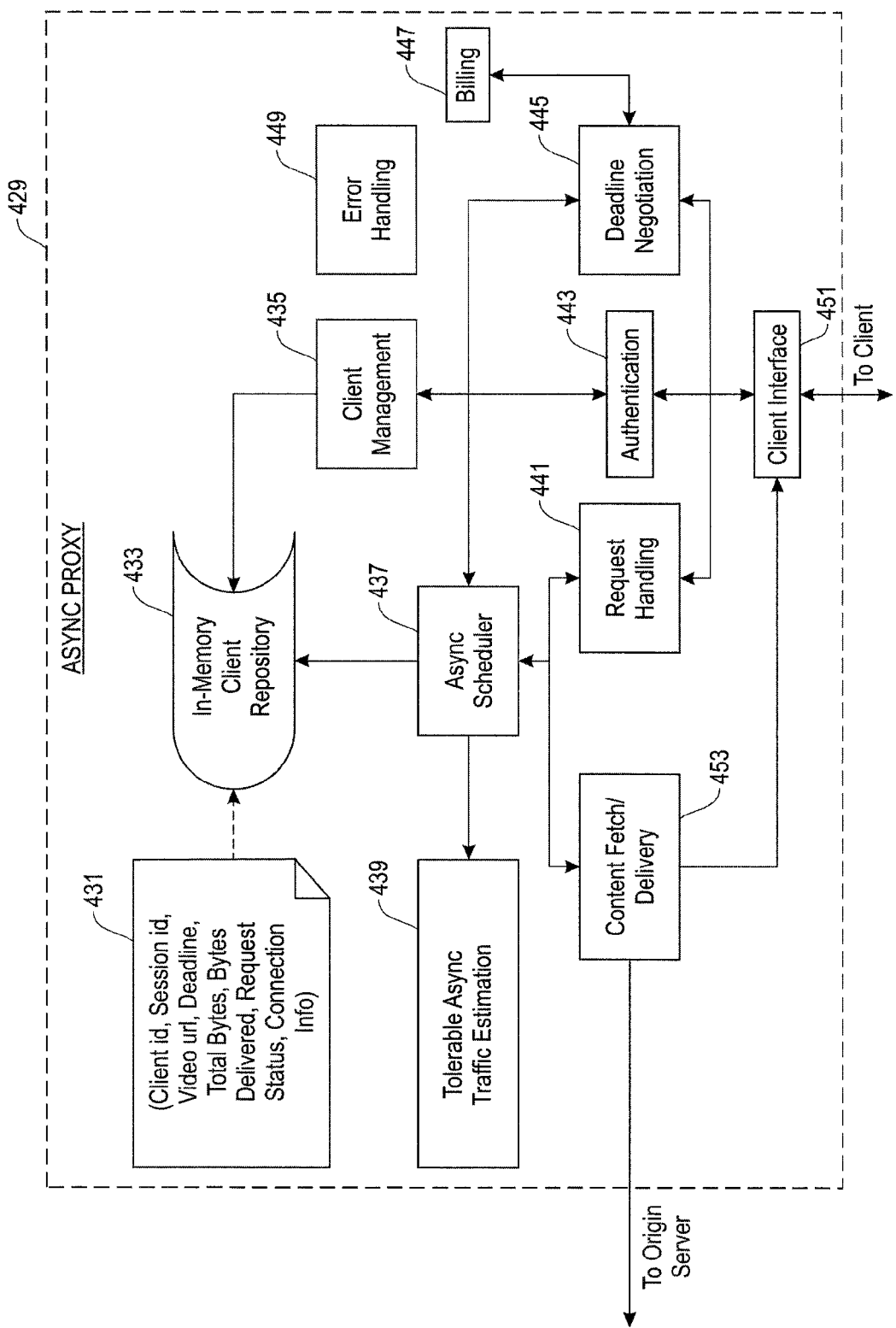
FIG. 4 is a diagram illustrating an Async proxy component, according to an embodiment of the invention.

FIG. 4 is a diagram illustrating an Async proxy component 429, according to an embodiment of the invention. By way of illustration, FIG. 4 depicts the Async proxy 429 for effecting delayed delivery of one or more items of content. As detailed herein, the Async proxy 429 can be contained, for example, at an Async server (such as Async server 118 as depicted in FIG. 1). In accordance with at least one embodiment of the invention, the Async proxy 429 can be located at any stage of a wireless network backhaul (such as component 109 as depicted in FIG. 1).

The Async proxy 429 controls the progression of delayed delivery flows by measuring currently available resources in all network base-stations, as well as measuring historical patterns and/or records of such resource availability. Also, as described herein, the Async proxy 429 identifies and/or determines all delayed-delivery users associated with the given network. Further, the Async proxy 429 schedules, via Async scheduler component 437, delayed flows to users (or user devices) according to associated deadline needs and network conditions.

As additionally depicted in FIG. 4, and in at least one embodiment of the invention, the Async proxy 429 includes an in-memory client (or user) repository 433, which maintains client- or user-specific information 431 such as, for example, client identifier (ID), session ID, video URL, a deadline for delivery to a client, total bytes, bytes already delivered, request status and connection information. Also, Async proxy 429 includes a client management module 435 that is in connection with the Async scheduler 437. As noted above, the Async scheduler 437 schedules data flows in accordance with estimated values, taking into account parameters from all user or clients.

As also depicted in FIG. 4, the Async proxy 429 includes a tolerable Async traffic estimation module 439, which estimates the number of flows that can transfer traffic simultaneously at their fair-shares at any given time, such that the interference on other demand flows is within the decided bound. Additionally, as illustrated in FIG. 4, a deadline negotiation module 445 within the Async proxy 429 negotiates (with the user and/or user device) deadlines and associated pricing. Accordingly, a client interface module 451 connects the Async proxy 429 with clients, while a content fetch and delivery module 453 establishes communication with the content origin server (such as server 126 as depicted in FIG. 1).

Further, as also depicted in FIG. 4, the Async proxy 429 includes multiple functional modules such as a request handling module 441, a client authentication module 443, a billing module 447 and an error handling module 449.

In at least one embodiment of the invention, a delayed delivery scheduler component (such as Async scheduler 437 as depicted in FIG. 4) determines and/or computes an estimation of deadlines for different flows based on a pricing regime. By way of example, when a new user (or user device) arrives and/or requests content, the proxy (such as Async proxy 429) computes a deadline based on the number of Async flows already accepted and the deadlines corresponding thereto, the size of the incoming user's request, the user's expected channel quality, an estimate of the traffic over the period of interest, and the pricing tier to which the user belongs.

Additionally, the delayed delivery scheduler component (such as Async scheduler 437 as depicted in FIG. 4) also generates an immediate scheduling of flows with requests pending. At each scheduling opportunity, the scheduler selects m active flows with the earliest deadline, wherein m is the permissible number of Async flows. The unscheduled flows, if any, are requested to poll-back after a certain duration of time. Alternatively, the scheduler can select m flows that present optimal channel conditions.

Also, in accordance with at least one embodiment of the invention, the delayed delivery scheduler component governs poll-back duration. If a user's polling request cannot be satisfied within a specified amount time (for example, one minute), the user is asked to poll back after a given poll-back duration (for example, x seconds). The poll-back duration can be computed, for example, based on the proxy's knowledge of bandwidth history, the currently active flows, the data pending for the active flows, and the deadlines associated with the active flows.

Additional description of the techniques detailed in FIG. 4 can be found, by way of example, in U.S. application Ser. No. 13/854,084, filed on Mar. 30, 2013 and entitled "Delayed Delivery with Bounded Interference in a Cellular Data Network," which is incorporated by reference herein in its entirety.

Figure 5:
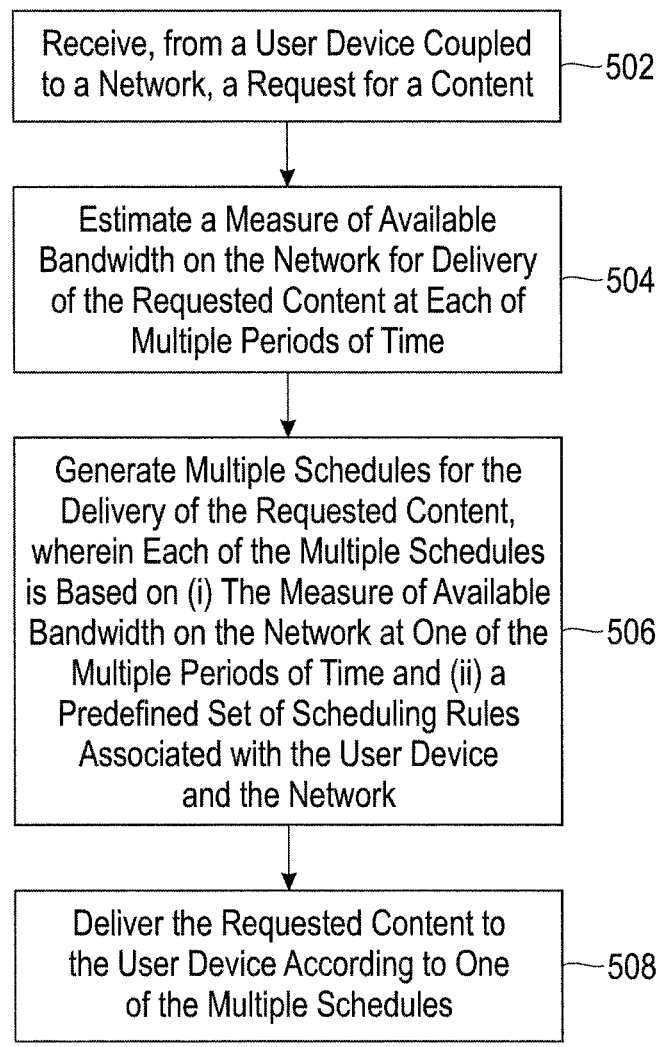
FIG. 5 is a flow diagram illustrating techniques according to an embodiment of the invention.

FIG. 5 is a flow diagram illustrating techniques according to an embodiment of the invention. Step 502 includes receiving, from a user device coupled to a network, a request for a content from the network. As detailed herein, the network can include, for example, a cellular network, a non-cellular wired network and/or a non-cellular wireless network (such as a Wi-Fi network). Step 504 includes estimating a measure of available bandwidth on the network for delivery of the requested content at each of multiple periods of time. Estimating can be based on historical bandwidth data associated with the network.

Step 506 includes generating multiple schedules for the delivery of the requested content, wherein each of the multiple schedules is based on (i) the measure of available bandwidth on the network at one of the multiple periods of time and (ii) a predefined set of scheduling rules associated with the user device and the network. In at least one embodiment of the invention, this generating step can include generating a ranked list of the multiple periods of time for the delivery of the requested content, and presenting the ranked list to a user associated with the user device.

The predefined set of scheduling rules can include at least one of a scheduling rule associated with current bandwidth utilization in the network, a scheduling rule associated with a price for downloading the requested content, a scheduling rule associated with an amount of data corresponding to the requested content, a scheduling rule associated with a minimum and/or a maximum time limit for the delivery of the requested content, a scheduling rule associated with a future estimation of network bandwidth utilization, a scheduling rule associated with one or more service level agreements, and a scheduling rule associated with an amount of resources used for content transmission.

Step 508 includes delivering the requested content to the user device according to a schedule selected from the multiple schedules. For example, the one schedule can be accepted by a user associated with the user device. Additionally, delivering can include downloading the requested content to the user device in a background function of the user device (for example, based on the lowest available cost, as pre-determined by the user). Further, delivering can include identifying a server containing the requested content that is located nearest to the user device, and transmitting the requested content from the server containing the requested content that is located nearest to the user device to the user device according to a determined network path for delivery of the requested content. A network path can be determined in a number of ways, such as, for example, based on the network topology and status of the links The techniques depicted in FIG. 5 can also include caching a second instance of the requested content at a server for subsequent transmission of the requested content to one or more other user devices.

At least one embodiment of the invention can also include fetching uniform resource locator information from a content server, wherein said uniform resource locator information corresponds to an item of content requested by a user device. Such an embodiment additionally includes calculating (i) multiple schedules for delivering the item of content to the user device and (ii) a corresponding pricing scheme corresponding to each of the multiple schedules, wherein said calculating is based on a number of already-accepted content delivery flows and each schedule corresponding thereto, a size of the item of content requested by the user device, network channel quality associated with the user device, and a pricing tier associated with the user device. Further, such an embodiment of the invention includes transmitting, to the user device, (i) the multiple schedules for delivering the item of content to the user device and (ii) the corresponding pricing scheme corresponding to each of the multiple schedules, and delivering the requested content to the user device according to one of the multiple schedules selected by the user device.

Figure 6:
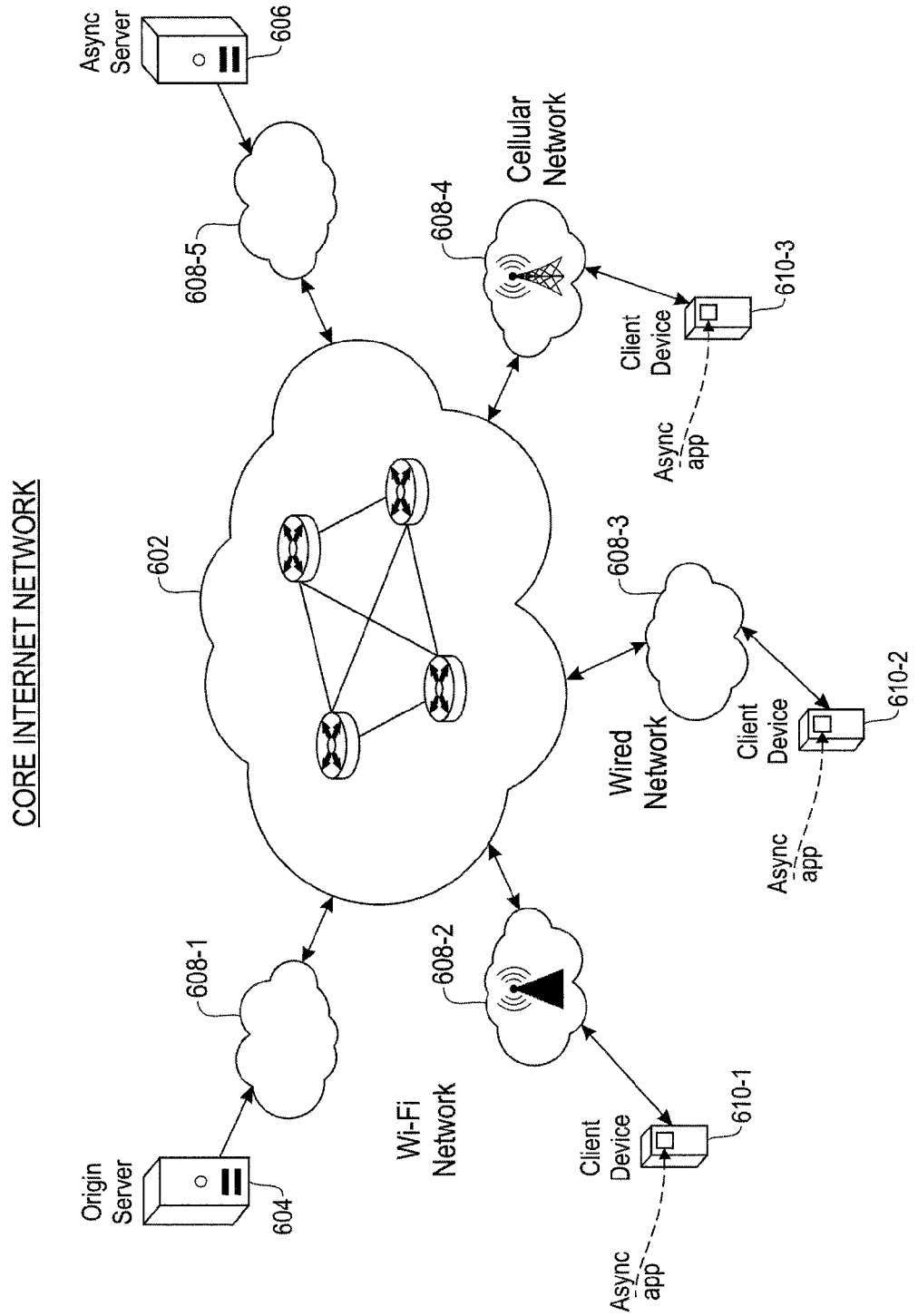
FIG. 6 is a network diagram of an exemplary network on which at least one embodiment of the invention can be implemented.

FIG. 6 is a network diagram of an exemplary network on which at least one embodiment of the invention can be implemented. By way of illustration, FIG. 6 depicts a core internet network 602, which is connected to one or more additional networks 608-1, 608-2, 608-3, 608-4 and 608-5 (collectively referred to herein as additional networks 608). As noted herein, such networks can include, for example, a cellular network 608-4, a non-cellular wired network 608-3 and/or a non-cellular wireless network (such as a Wi-Fi network 608-2). Additionally, FIG. 6 also depicts an origin server 604, which interacts with one of the additional networks 608, as well as an Async proxy server 606, which also interacts with one of the additional networks 608. In accordance with at least one embodiment of the invention, the Async proxy server 606 as well as the origin server 604 can be located anywhere in the internet network.

Also, FIG. 6 depicts client devices 610-1, 610-2 and 610-3 (collectively referred to herein as client devices 610), which interact with one or more of the additional networks 608.

The techniques depicted in FIG. 5 and detailed herein can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 and described herein can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 7:
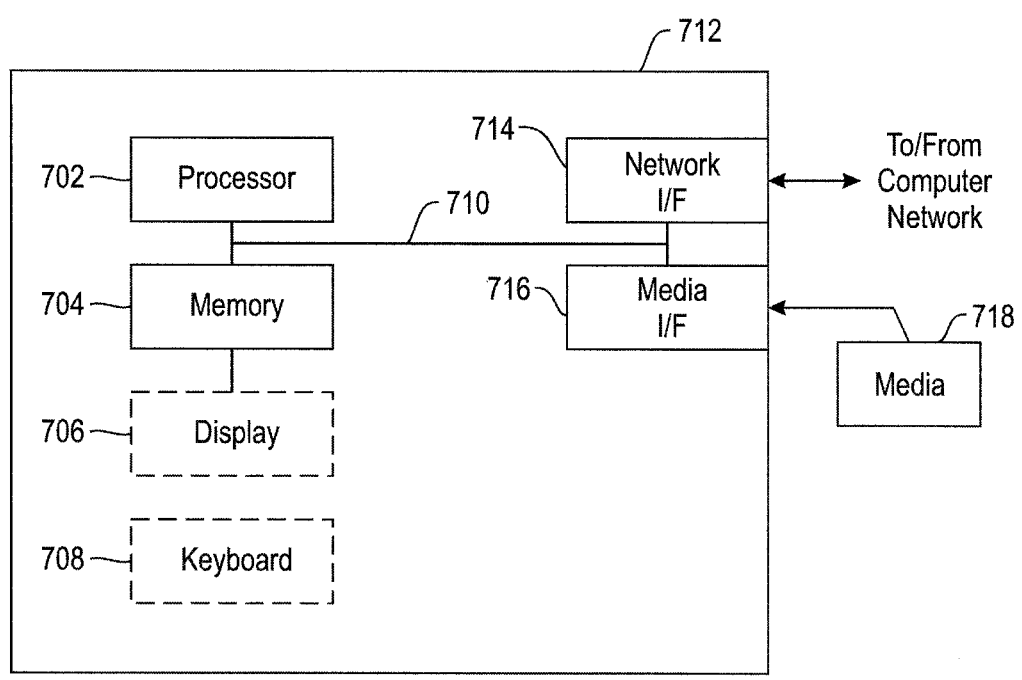
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, network-controlled delayed-delivery of data to users such that data are transferred at periods of low spectrum demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
 receiving, from a user device coupled to a network, a request for content from the network;
 estimating a measure of available bandwidth on the network for delivery of the requested content at each of multiple periods of time;
 generating multiple schedules for the delivery of the requested content, wherein each of the multiple schedules is based on (i) the measure of available bandwidth on the network at one of the multiple periods of time and (ii) a predefined set of scheduling rules associated with the user device and the network; and
 delivering the requested content to the user device according to a schedule selected from the multiple schedules, wherein the selected schedule comprises multiple delivery times that are each (i) previously agreed-to by the user and (ii) based on (a) price sensitivity of the user and (b) usage level of the network, and wherein said delivering comprises delivering the requested content to the user device at the earliest of the multiple delivery times that satisfies a parameter associated with the usage level of the network;
 wherein said receiving, said estimating, said generating, and said delivering are carried out by a computing device.

2. The method of claim 1, wherein said network comprises at least one of a cellular network, a non-cellular wired network and a non-cellular wireless network.

3. The method of claim 1, wherein said estimating is based on historical bandwidth data associated with the network.

4. The method of claim 1, wherein a user associated with the user device accepts the one of the multiple schedules.

5. The method of claim 1, wherein said generating comprises generating a ranked list of the multiple periods of time for the delivery of the requested content.

6. The method of claim 5, comprising:
 presenting the ranked list to a user associated with the user device.

7. The method of claim 1, wherein said predefined set of scheduling rules comprises a scheduling rule associated with current bandwidth utilization in the network.

8. The method of claim 1, wherein said predefined set of scheduling rules comprises a scheduling rule associated with a price for downloading the requested content.

9. The method of claim 1, wherein said predefined set of scheduling rules comprises a scheduling rule associated with an amount of data corresponding to the requested content.

10. The method of claim 1, wherein said predefined set of scheduling rules comprises a scheduling rule associated with a minimum and/or a maximum time limit for the delivery of the requested content.

11. The method of claim 1, wherein said predefined set of scheduling rules comprises a scheduling rule associated with a future estimation of network bandwidth utilization.

12. The method of claim 1, wherein said predefined set of scheduling rules comprises a scheduling rule associated with one or more service level agreements.

13. The method of claim 1, wherein said predefined set of scheduling rules comprises a scheduling rule associated with an amount of resources used for content transmission.

14. The method of claim 1, wherein said delivering comprises downloading the requested content to the user device in a background function of the user device.

15. The method of claim 1, wherein said delivering comprises identifying a server containing the requested content that is located nearest to the user device.

16. The method of claim 15, comprising:
 transmitting the requested content from the server containing the requested content that is located nearest to the user device to the user device according to a determined network path for delivery of the requested content.

17. The method of claim 1, comprising:
  caching a second instance of the requested content at a server for subsequent transmission of the requested content to one or more other user devices.

18. An article of manufacture comprising a computer readable storage medium having computer readable instructions tangibly embodied thereon which, when implemented, cause a computer to carry out a plurality of method steps comprising:
  receiving, from a user device coupled to a network, a request for a content from the network;
  estimating a measure of available bandwidth on the network for delivery of the requested content at each of multiple periods of time;
  generating multiple schedules for the delivery of the requested content, wherein each of the multiple schedules is based on (i) the measure of available bandwidth on the network at one of the multiple periods of time and (ii) a predefined set of scheduling rules associated with the user device and the network; and
  delivering the requested content to the user device according to a schedule selected from the multiple schedules, wherein the selected schedule comprises multiple delivery times that are each (i) previously agreed-to by the user and (ii) based on (a) price sensitivity of the user and (b) usage level of the network, and wherein said delivering comprises delivering the requested content to the user device at the earliest of the multiple delivery times that satisfies a parameter associate with the usage level of the network.

19. A system comprising:
  a memory; and
  at least one processor coupled to the memory and configured for:
    receiving, from a user device coupled to a network, a request for a content from the network;
    estimating a measure of available bandwidth on the network for delivery of the requested content at each of multiple periods of time;
    generating multiple schedules for the delivery of the requested content, wherein each of the multiple schedules is based on (i) the measure of available bandwidth on the network at one of the multiple periods of time and (ii) a predefined set of scheduling rules associated with the user device and the network; and
    delivering the requested content to the user device according to a schedule selected from the multiple schedules, wherein the selected schedule comprises multiple delivery times that are each (i) previously agreed-to by the user and (ii) based on (a) price sensitivity of the user and (b) usage level of the network, and wherein said delivering comprises delivering the requested content to the user device at the earliest of the multiple delivery times that satisfies a parameter associated with the usage level of the network.

* * * * *